(12) United States Patent
Hiscock et al.

(10) Patent No.: US 11,558,763 B2
(45) Date of Patent: Jan. 17, 2023

(54) ELECTRONIC SHELF LABEL (ESL) EFFICIENT RECONNECT

(71) Applicant: QUALCOMM Incorporated, San Diego, CA (US)

(72) Inventors: Paul Dominic Hiscock, Cambridge (GB); Robin Heydon, Cambridge (GB); Thomas Allan, St Neots (GB); Nicolas Graube, Cambridge (GB)

(73) Assignee: QUALCOMM INCORPORATED, San Diego, CA (US)

(*) Notice: Subject to any disclaimer, the term of this patent is extended or adjusted under 35 U.S.C. 154(b) by 43 days.

(21) Appl. No.: 17/110,565

(22) Filed: Dec. 3, 2020

(65) Prior Publication Data

US 2021/0282035 A1 Sep. 9, 2021

Related U.S. Application Data

(60) Provisional application No. 62/984,419, filed on Mar. 3, 2020.

(51) Int. Cl.
*H04W 24/08* (2009.01)
*G06Q 30/02* (2012.01)
(Continued)

(52) U.S. Cl.
CPC ........ *H04W 24/08* (2013.01); *G06K 7/10297* (2013.01); *G06Q 10/087* (2013.01); *G06Q 30/02* (2013.01); *H04B 17/318* (2015.01)

(58) Field of Classification Search
CPC . H04W 24/08; H04B 17/318; G06K 7/10297; G06Q 10/087; G06Q 30/02
(Continued)

(56) References Cited

U.S. PATENT DOCUMENTS

| 7,417,545 B1 | 8/2008 | Crooks |
| 8,120,494 B1 * | 2/2012 | Aiouaz ............ G06K 7/10128 340/7.25 |

(Continued)

FOREIGN PATENT DOCUMENTS

| EP | 1788520 A1 | 5/2007 |
| EP | 2755436 A1 * | 7/2014 ............ H04W 12/00 |

(Continued)

OTHER PUBLICATIONS

International Search Report and Written Opinion—PCT/US2021/014414—ISA/EPO—May 6, 2021.

*Primary Examiner* — Mong-Thuy T Tran
(74) *Attorney, Agent, or Firm* — Muncy, Geissler, Olds & Lowe, P.C.

(57) ABSTRACT

According to various aspects and techniques to enable methods and systems for a first communication device to determine an approximate number of other communication devices that have lost contact with a host communication device. This includes determining a common future time window using a last known global time stamp and determining a transmit time within the common future time window. This also includes receiving samples that are captured during the common future time window on a predefined communication channel, as well as analyzing the received samples to estimate the total number of other communication devices.

14 Claims, 8 Drawing Sheets

(51) Int. Cl.
  *H04B 17/318* (2015.01)
  *G06K 7/10* (2006.01)
  *G06Q 10/08* (2012.01)

(58) Field of Classification Search
  USPC .......................................................... 455/423
  See application file for complete search history.

(56) References Cited

U.S. PATENT DOCUMENTS

| | | | | |
|---|---|---|---|---|
| 8,319,607 | B2* | 11/2012 | Grimlund | G06Q 10/087 |
| | | | | 705/28 |
| 9,454,919 | B2* | 9/2016 | Park | G08B 5/36 |
| 10,154,526 | B2* | 12/2018 | Borden | H04W 4/80 |
| 10,990,629 | B2* | 4/2021 | Kamath | G06F 16/907 |
| 11,336,334 | B2* | 5/2022 | Kolehmainen | G01S 1/00 |
| 11,340,589 | B2* | 5/2022 | Celia | G06N 3/0472 |
| 2006/0220843 | A1* | 10/2006 | Broad | G08B 25/10 |
| | | | | 340/539.23 |
| 2010/0013933 | A1* | 1/2010 | Broad | G08B 25/10 |
| | | | | 348/E7.085 |
| 2013/0121221 | A1* | 5/2013 | HomChaudhuri | ........................ |
| | | | | H04W 52/0258 |
| | | | | 370/311 |
| 2017/0262044 | A1* | 9/2017 | Takenaka | H04W 52/0229 |
| 2020/0132470 | A1* | 4/2020 | Xu | G06Q 10/087 |

FOREIGN PATENT DOCUMENTS

| | | | |
|---|---|---|---|
| JP | 2009206764 | A | 9/2009 |
| WO | 2018229682 | A1 | 12/2018 |
| WO | 2019237725 | A1 | 12/2019 |

* cited by examiner

ELECTRONIC SHELF LABEL (ESL) EFFICIENT RECONNECT

CROSS-REFERENCE TO RELATED APPLICATION

The present application for patent claims the benefit of U.S. Provisional Application No. 62/984,419 entitled "Electronic Shelf Label (ESL) Efficient Reconnect," filed on Mar. 3, 2020 and assigned to the assignee. The provisional application is expressly incorporated herein by reference in its entirety.

FIELD OF DISCLOSURE

The various aspects and embodiments described herein generally relate to communication systems, operation and recovery mechanisms for communication devices on a communication network and reestablishing connections when they are lost or impaired. Also related are electronic tags, Radio Frequency Identification (RFIDs), Electronic Shelf Labels (ESLs), and more particularly, to methods that can enable reconnection on a network between Access Points (APs) and ESLs upon loss of power or loss of the communication network.

BACKGROUND

Wireless communication systems are widely used to enable and provide data communication and support for various applications and types of communication content, such as voice, video, data and so on. These wireless communication systems can also be used to implement an ESL based system for an enterprise. ESLs are used to display product information (e.g. price), as well as means for providing an effective way to update the ESLs via the communication network, such as a wireless communication network.

An ESL system typically uses lower power processors and CPUs to lower overall power consumption. Also, since ESLs are typically powered by batteries, lower power consumption and maximizing battery life are very important design considerations. An ESL also uses various user interfaces and display units to convey pertinent information to an end user.

In one scenario, one or more Access Points. (APs) may connect to hundreds of thousands of ESLs representing the complete inventory of a business, warehouse or enterprise. A Management Entity (ME) is used to control the APs and enable them to connect and maintain communication to the ESLs. There are times during operation, where the ESLs may lose connectivity momentarily or for more extended periods of time. It would be a technical advantage to facilitate the reconnection process and reduce or eliminate any unwanted consequences or system performance degradations.

SUMMARY

The following information presents a simplified summary relating to one or more aspects, technical advantages and/or embodiments disclosed herein. As such, the following summary should not be considered an extensive overview relating to all contemplated aspects and/or embodiments, nor should the following summary be intended to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects and technical advantages, a method for am un-connected communication device to determine an approximate number of other un-connected communication devices that have lost contact with a host communication device. This includes determining a common future time window using a last known global time stamp, as well as determining a transmit time within the common future time window. It also involves capturing received samples during the common future time window on a predefined communication channel, as well as analyzing the received samples to estimate the total number of other communication devices.

According to various aspects and technical advantages, an apparatus for an un-connected communication device is used to determine an approximate number of other un-connected communication devices that have lost contact with a host communication device. This includes a processor for determining a common future time window using a last known global time stamp, and a transmitter and receiver for determining a transmit time within the common future time window. Also included is a processor memory for capturing received samples during the common future time window on a predefined communication channel, as well as an analyzer for analyzing the received samples to estimate the total number of other communication devices.

According to other various aspects and technical advantages, a communication means for determining a common future time window using a last known global time stamps. This includes means for determining a transmit time within the common future time window, as well as means for capturing received samples during the common future time window on a predefined communication channel. Also included are means for analyzing the received samples to estimate the total number of other communication devices.

According to other various aspects and technical advantages, a communication device includes a means for determining a common future time window using a last known global time stamp; a means for determining a transmit time within the common future time window; a means for capturing received samples during the common future time window on a predefined communication channel; and means for analyzing the received samples to estimate the total number of other communication devices.

According to other various aspects and technical advantages, a computer-readable storage medium, having computer-executable instructions recorded thereon, the computer-executable instructions configured to cause a communication device having one or more processors which perform the following functions. Determine a common future time window using a last known global time stamp. Determine a transmit time within the common future time window. Capture received samples during the common future time window. Capture received samples during the common future time window on a predefined communication channel. And analyze the received samples to estimate the total number of other communication devices.

According to other various aspects and technical advantages, an Electronic Shelf Label (ESL) method including supplying power at a power supply unit. Monitoring and controlling a plurality of systems and subsystems of the ESL system at a control unit. Storing data required for processing at a memory unit. Transmitting and receiving data at a communication unit. Supporting a communication network for the ESL systems and displaying information at a display unit. Detecting a status of one or more ESLs at a detection unit and the control unit uses the detected status to adjust the operation of the ESL. Other objects and technical advantages associated with the aspects and embodiments disclosed herein will also be apparent to those skilled in the art, based on the accompanying drawings, and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
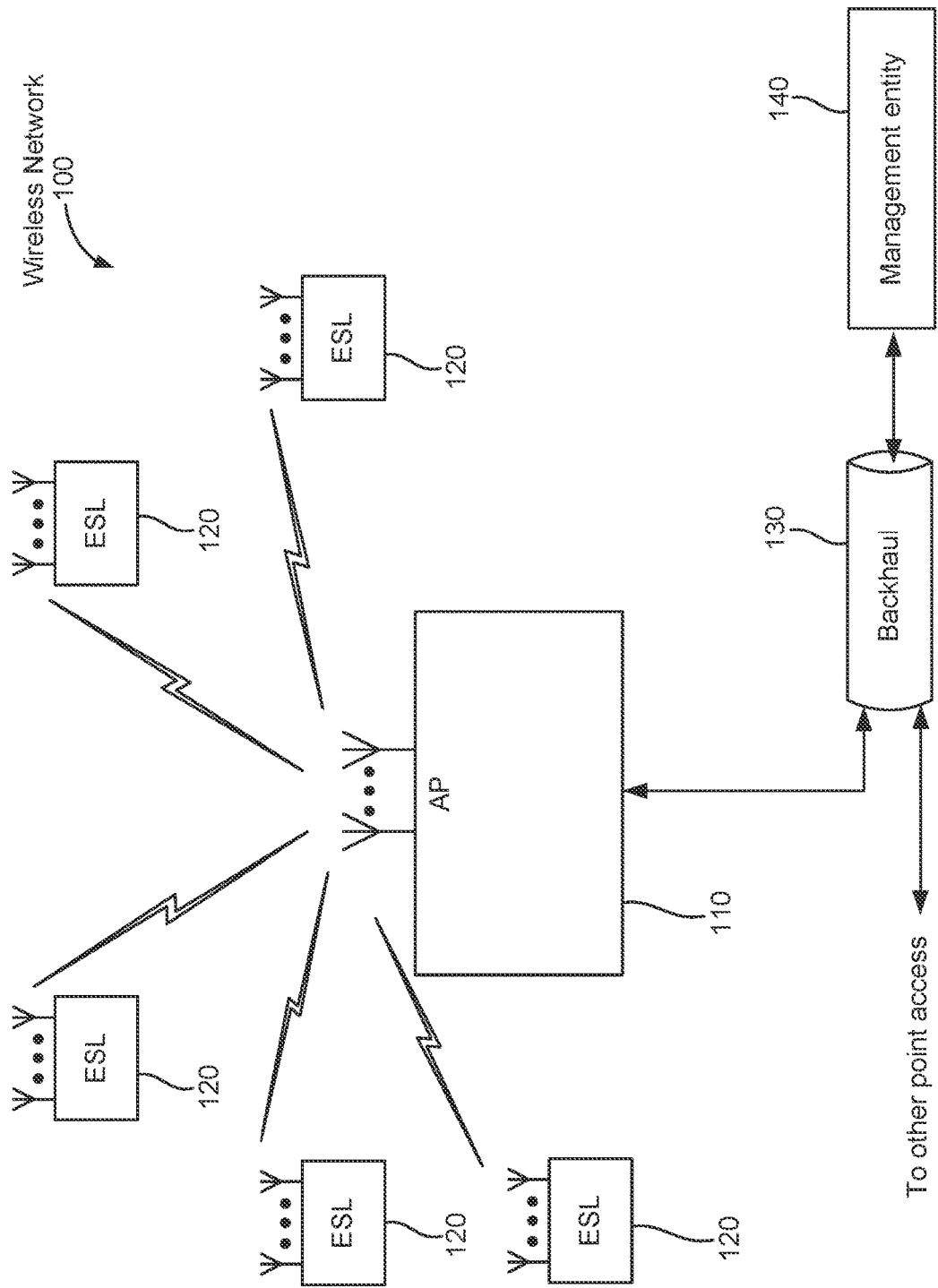
FIG. 1 illustrates an ESL communication network.

Various aspects and embodiments are disclosed in the following description and related drawings to show specific examples relating to exemplary aspects and embodiments. Alternate aspects and embodiments will be apparent to those skilled in the pertinent art upon reading this disclosure, and they may also be constructed and practiced without departing from the scope or spirit of the disclosure. Additionally, well-known elements will not be described in detail or may be omitted, so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the station, and the UL (or reverse link) may refer to the communication link from the station to the AP.

FIG. 1 illustrates one possible implementation of an ESL system in a wireless network 100 configuration. One exemplary grouping of ESLs 120 is coupled to an AP 110. The AP helps manage and control the entire ESL system and all of the interconnected devices.

One or more network access points may be configured to communicate with one or more network entities via a wire-based or wireless backhaul connection 130. In some aspects, network interfaces may be implemented as transceivers configured to support wire-based or wireless signal communication. For example, this communication may involve sending and receiving messages, parameters, and/or other types of information content or data.

In some aspects, transceiver circuitry includes at least on transmitter and at least one receiver. This may include an integrated device containing both transmitter and associated transmitter circuitry and receiver and associated receiver circuitry on one monolithic or integrated device. They may also be separate and distinct devices or hybrid combinations of devices for a plurality of transmitter and receiver configurations.

In FIG. 1, the coupling shown (e.g. between an ESL 120 and the AP 110) is wireless and bidirectional, however other coupling methods such as hard wiring (or a hybrid combination of the two coupling methods or mechanisms working together) can be used, without deviating from the devices, methods, spirit and scope disclosed herein. The management entity (ME) 140 provides control and processing, as well as other functionality used to support and implement the ESL system. It can implement a supervisory or master role too within the communication network.

The following discusses some exemplary implementations of an ESL system. ESLs may be used to track and identify thousands, tens of thousands or hundreds of thousands of product items for sale. It is often a business requirement or design goal to have an inventory of items, whose prices must be updated frequently, accurately and within minimum business disruption. The electronic display modules can be updated from a central control or management system by using wireless (or hard-wired or combination thereof) communications. Hard-wired systems have obvious problems in terms of the layout limitations caused by complicated cabling due to the high number of individual ESLs that are connected, as well as the widespread physical footprint or topology that encompasses all of the ESLs used in a given network.

Wireless ESL systems use individual power supplies (e.g. a battery) for each ESL. It is also advantageous for each ESL to have a long duration power supply lifetime (i.e. a long operational lifetime for the batteries before a replacement is warranted). Some of these batteries may last seven (7) years or more. Some of these batteries are related to those that power quartz watches for a year or more. Those skilled in the art will also appreciate that, in addition to battery power, other power sources can be used, such as hard-wired power, energy harvesting and magnetic coupling as some examples.

In addition, the wireless systems need to be able to provide dependable communication channels in environments that have a high number of individual receiver-transmitter units and to operate with minimum transmitting power levels in order to prolong battery life.

There are times during operation, where the ESLs may lose connectivity, either momentarily or for more extended periods of time. Network outages, power outages, device failure and obstructions (both physical and non-physical) can cause these losses, as well as other events or situations. One desirable technical advantage or design goal is to facilitate reconnection of the ESLs, when this connectivity is lost or hindered in some manner. Some of the ESL design elements or considerations involved in supporting reconnection are as follows.

Selecting a suitable battery is one of them. The battery life is evaluated and selected so that it is not a limiting factor in the design of an ESL. For example, a battery life of around five (5) years or more provides some advantages. The ESL typically contains a display [e.g. liquid crystal display (LCD), light emitting diode (LED), etc.].

In one representative example, a display possessing a latency of less than two (2) seconds is advantageous. This tends to increase processing efficiencies, reduce system downtime, reduce power consumption, increase operational reliability and achieve other desirable design goals and objectives.

The ESLs may be moved, either by accident (e.g. a person or piece of equipment impacts the ESL) or deliberately (e.g. an employee moves the inventory stock around), and they must be able to reconnect to a different AP quickly. The wireless connection to ESLs may be temporarily blocked by customers, trolleys/shopping carts or employees that are stacking the shelves. In this case, the ESL may lose connection and must figure out whether to reconnect to the same AP or try and move to a different AP, and it needs to do all of this with minimal power consumption, network disruption and latency.

There are computational and performance advantages to try and re-establish connections with the same AP that the ESLs were connected to, prior to losing previous connections.

In one implementation, a method for an un-connected communication device (e.g. radio devices) is used to determine an approximate number of other un-connected communication devices that have lost contact with a host communication device.

It should be noted that an ESL and an Access Point are maintaining synchronisation without needing to establish a periodic connection. Instead, an Access Point may broadcast and an ESL may listen (at a point it time where the broadcast occurs, based on the knowledge of synchronisation/schedule previously exchanged). At the start of the relationship between an AP and an ESL, an on-boarding process has occurred. This is achieved via a connection, which is then closed when the information has been exchanged.

For purposes of this disclosure, one example of connected information devices is devices that can exchange information with each other. This exchange of information can be directional or bidirectional in nature. For instance, this may refer to a situation where given two devices (e.g. Device A and Device B), Device B is capable of receiving information from Device A, and conversely, Device A is also capable of receiving information from Device B. An un-connection (i.e. the state of being not connected) of these two devices occurs when Device B is no longer able to communicate with Device A. The term connectivity refers to the situation where information is being exchanged between at least two entities. An un-connection is when the two devices are not capable of communicating with each other.

There are many different situations where devices are communicating with each other (and therefore considered connected). A host device is sending out beacon signals to other individual devices that are connected via a communication network. As long as this beacon is being received at a device, there is a connection. This may be only one way communication, but this is the minimum connection that is needed to support operation. The present disclosure does not intend to limit connection to two way communications only. It can be unidirectional, bidirectional and any combinations thereof.

Various communication devices can receive information for establishing a link with an AP. Communication devices may link, or associate with an AP. For example, a communication device can send association requests to the AP. In one example, the association requests can be referred to generally as access requests. The AP can also respond with association responses. Generally, association responses can be referred to as access responses. Within a given network, there may be a large number of association requests. For example, where a large number of communication devices come within range of the AP, the AP may receive hundreds of association requests in a relatively short amount of time. In some situations, overlapping association messages can collide, ultimately increasing link setup time and latency, and decreasing overall network performance.

In some implementations, communication devices can be configured to delay transmission of association requests, thereby reducing the rate of collisions. For example, transmission time slots can be determined and a back-off amount within the identified time slot selected. By identifying a time slot during which to transmit the delayed association request, the requests can be spread over multiple time slots. Where the number of communication devices is greater than the number of available time slots, controlling when each device assigned to the same time slot transmits can improve efficiency.

An AP can schedule transmission of access responses (e.g., probe responses and/or association responses) during an access response window. For example, the AP can be configured to transmit access response messages during specified transmit windows. The access response window can be dynamic (e.g. based on the number of pending responses). In some implementations, the AP can also be configured to request a contention free period (e.g. clear-to-send) before transmitting the access response message. Accordingly, signal collisions can be reduced or practically eliminated.

Figure 2:
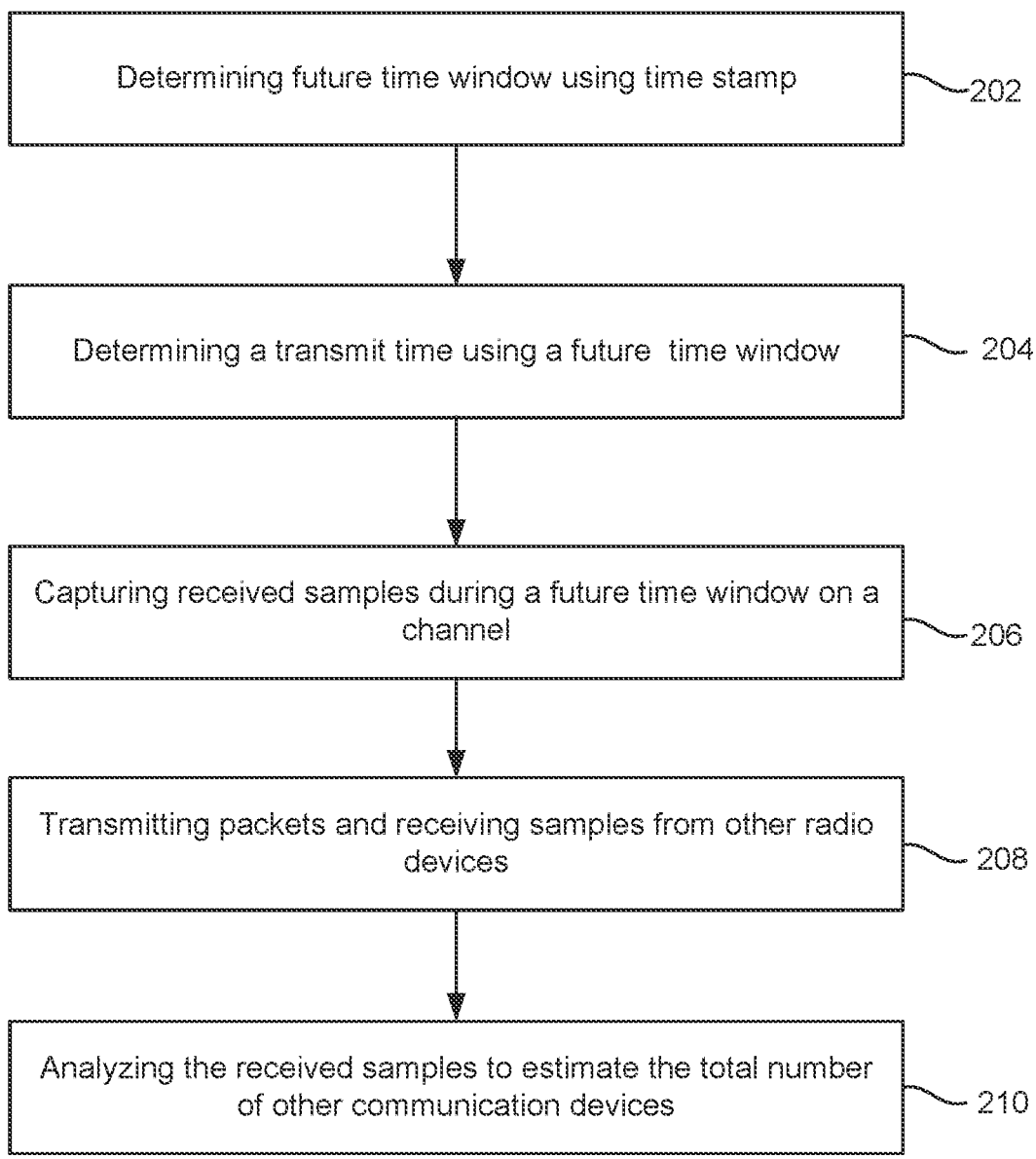
FIG. 2 illustrates an exemplary method for determining an approximate number of un-connected communication devices that have lost contact with a host communication device.

FIG. 2 illustrates a top level flow diagram of one exemplary method disclosed herein 200. A time stamp is used to determine a future time window 202. A time stamp is an indication of when a certain event has occurred. For example, the time stamp can be a sequence or characters or encoded information. A time window is an interval of time. Some pertinent features of an exemplary time window are stop, start and duration. A transmit time is determined using a future time window 204.

Samples of data are received during a future time window on a selected channel 206. Additionally, the method supports transmitting packets and receiving samples from other radios or communication devices 208 that are present in the network. The received samples are analyzed to estimate the total number of other communication devices 210 in the network.

There are many different situations or events that may result in an un-connection. There is a network where a host device is communicating with a plurality of individual communication devices. During this communication period, the host device is able to send a time stamp to each of the individual communication devices on a regular basis.

An instruction may be time delayed. The time delay may be a predetermined delay that provides enough time to complete all outstanding operations associated with a task before an event (e.g. a power down operation). The time delay may be implemented by inserting one or more Network Outage Packet (NOP) instructions in the program between the last instruction for the task and the wait instruction. Each NOP instruction causes a processor to do nothing for the duration of one instruction cycle. This effectively delays the execution of the instruction by one instruction cycle. In one example, an instruction cycle may equal one clock cycle. Other clock cycle schemes may also be implemented. The number of NOPs may be chosen to achieve the desired time delay. For example, a time delay of ten instruction cycles may be achieved by inserting ten NOP operations between the last instruction for the task and the instruction.

Figure 3:
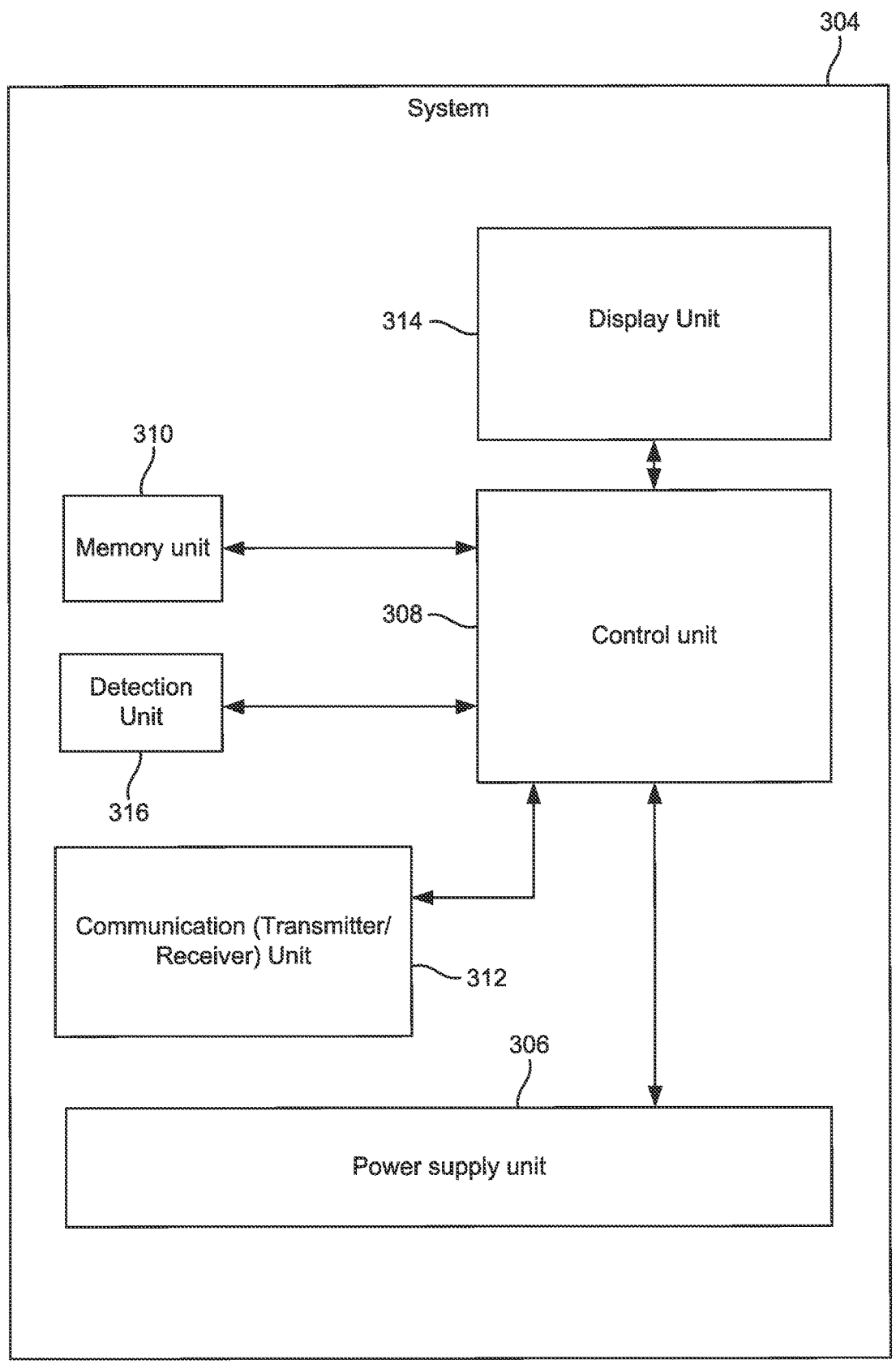
FIG. 3 illustrates an exemplary ESL apparatus.

An exemplary ESL apparatus or system 304 to implement the functionality disclosed herein is illustrated in FIG. 3. A power supply unit 306 is shown connected to a control unit 308. Some of the functionality provided by the power supply unit 306 is power generation, power regulation within desired operational parameters, power conditioning and power filtering, etc. The control unit 308 monitors and controls a plurality of systems and subsystems of the ESL system. A memory unit 310 stores data required for processing and supporting all of the computational and functional operations needed for implementation. A communication unit 312 supports both transmitting and receiving data. The bidirectional arrows illustrated in FIG. 3 show exemplary connections between the various units shown in the system 304. A display unit 314 is also shown to provide an interface for any information or data that an end user or system desires to see, monitor or utilize, as well as a detection unit 316 that detects certain conditions, operations, or events that are utilized by the system. Those skilled in the art will appreciate that other exemplary implementations of the FIG. 3 apparatus or system above may also be used without departing from the spirit or scope of the present disclosure.

Figure 4:
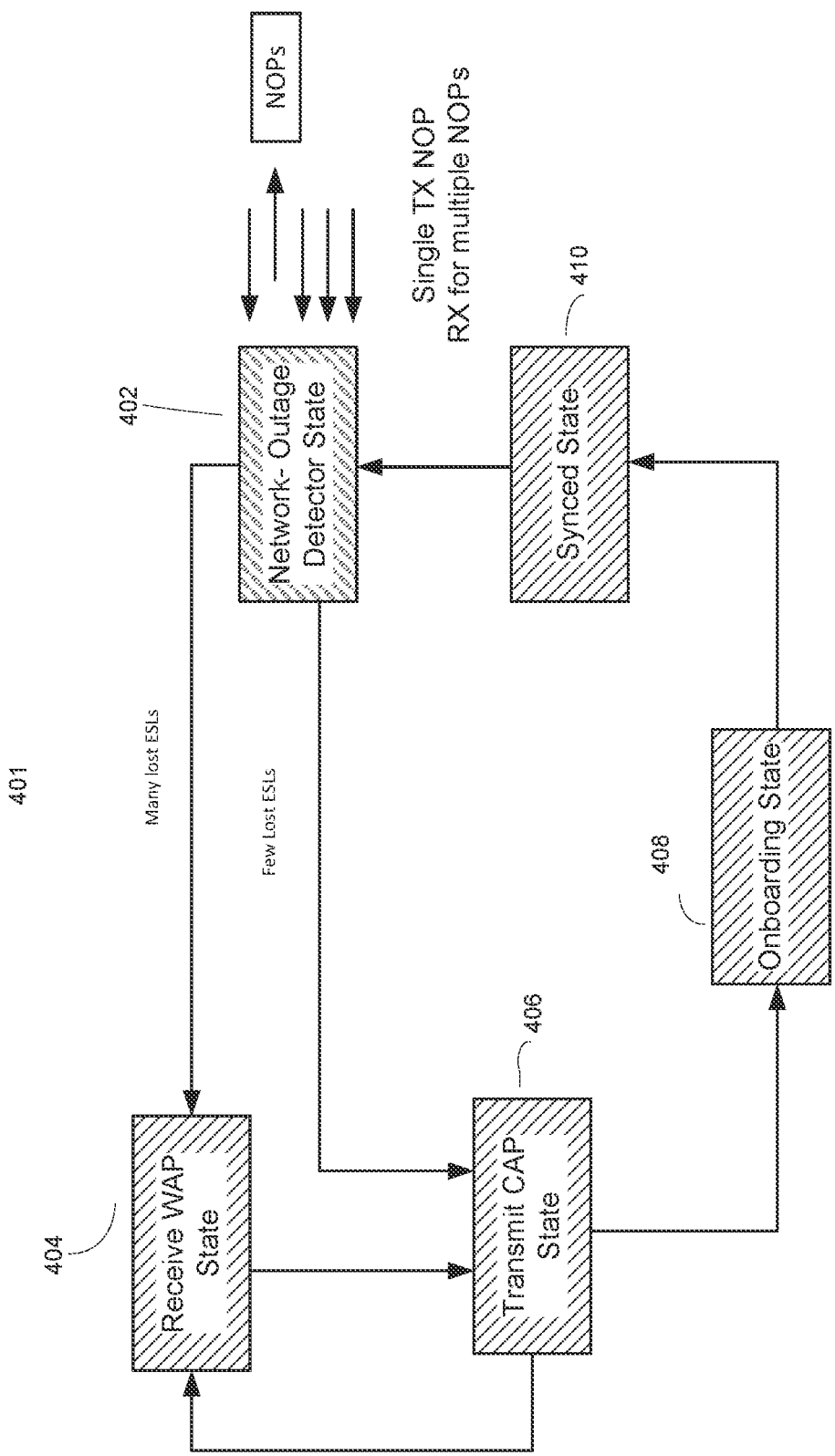
FIG. 4 illustrates an exemplary network-outage detector including network outage packets.

FIG. 4 illustrates an exemplary network-outage detector. The network-outage detector can detect various events. These events include a power cut or a complete or partial network-outage. Various inputs and outputs are input into and out of the network-outage detector 401. Included in this network-outage detector is a network outage detector state operation 402, a receive WAP state operation 404 and a transmit CAP state operation 406. Also shown are an onboarding state 408, as well as a synced state 410.

FIG. 4 also shows a single transmitting (TX) Network Outage Packet (NOP), as well as receiving (RX) multiple NOPs. The network-outage detector counts the number of lost ESLs. If there are a few lost ESLs, reduced sleep occurs in the TX controlled access phase (CAP) state. A CAP may be initiated by the AP whenever it wants to send data (e.g. a frame) or to receive data (e.g. a frame). If many communication devices or stations try to communicate at the same time, many collisions will occur. This could lower the available bandwidth and possibly result in a congestive collapse network event.

Some of the benefits associated with the network-outage detector is that is monitors and counts other lost-sync ESL devices. If the count shows that there are many lost-sync ESL devices, this indicates that a possible network-outage may have occurred. This makes some ESLs sleep longer and may prevent many devices from transmitting at the same or close to the same time, thereby reducing collisions. Conversely, if the count shows that there are few lost-sync ESL devices, CAP transmittal resyncs quickly. In one example, when the TX CAP sleep period was reduced to four (4) seconds, network performance improved measurably.

In one scenario, a group of network-connected devices belong to a communication network. The group of network-connected devices includes one or more network-connected devices, plus at least one control device that is configured to selectively authorize new devices to join the communication network. This process is called on-boarding (FIG. 4, 412).

Within a network, at least one communication device can be implemented as a controlling or managerial type of device. The network supports communications through a network interface with an associated interface type (e.g., WiFi, Bluetooth, Infrared (IR), LTE Direct, WiFi Direct, etc.).

In another scenario, the one or more network-connected devices that are separate from the at least one control or managerial device can be considered optional in the case where a first device is being on-boarded to the network. A single control device may perform the on-boarding procedure, although it will be appreciated to those of skill in the art that more than one control device could be used in other exemplary implementations. For example, an operator could on-board new devices to the communication network using a handset device, a laptop computer or a tablet computer at different times, such that different control devices can be used to on-board devices to the same communication network. The communication network can also be a secure local communication network.

In one example, a host has been able to send a time stamp to all of the devices that are communicating with the host. At some point in time, that communication has been lost. Things such as a power outage, network outage, physical obstruction, or the devices breaking or failing may cause such an un-connection. However, what may not be known is the specific cause of the un-connection.

Upon one device experiencing this loss of communication with the host device, this device wants to find out how many other devices find themselves in the same situation or predicament as itself. As an individual device, the device sends out a transmission some time in a random window, to help determine if the neighboring devices are experiencing a similar situation or predicament to the individual device.

A change of state in the network has occurred, where devices that were previously communicating with each other are no longer communicating. This includes determining a common future time window using a last known global time stamp. Global time is sent by the AP to each ESL. Global time is used in a network to help establish time synchronization and as a reference. Additionally, a transmit time is determined within the common future time window capturing received samples during the common future time window on a predefined communication channel. The received samples are analyzed to estimate the total number of other communication devices that are on the communication network.

Before un-connected ESLs attempt to reconnect, the system checks to see if there is a network outage or a power outage. The system then attempts to count the number of devices that find themselves in the same operational predicament. Following an outage (network, power, etc.), it is a desired technical advantage for the ESLs to reconnect to the APs in a relatively short period of time and with low power consumption or loss. The faster the reconnect time and the lower the power consumed or expended the better.

Packet sniffing looks at each packet as it flows across a network. It is a technique in which a user sniffs data belonging to other users of the network. Packet sniffers can operate for various reasons, such as an administrative tool, a performance monitoring/improvement tool or for malicious purposes (depending on the user's intent). Network administrators use them for monitoring and validating network traffic. Packet sniffers are basically applications or programs used to read packets that travel across the network. (packets are retrieved from a network layer and data is interpreted.) Packet sniffers are very useful for network administration in general.

In one scenario, an ESL performs a sniff operation. Then it transmits a message based on the sniff within a threshold period of time following the sniff. In one exemplary passive synchronization scenario, the ESLs will wake up every one to two seconds, and then they will attempt to resynchronise their timing to the AP they are interfacing with. If an ESL fails to see the sync, it will know a problem may exist (or is about to occur). However, the AP by itself, may not necessarily know that a problem truly exists.

Before un-connected ESLs attempt to reconnect, the system checks to see if there is a network outage or a power outage. The system then attempts to count the number of devices that find themselves in the same operational predicament. Following an outage (network, power, etc.), it is a desired technical advantage for the ESLs to reconnect to the APs in a relatively short period of time and with low power consumption or loss. The faster the reconnect time and the lower the power consumed or expended the better. Packet sniffing looks at each packet as it flows across a network. It is a technique in which a user sniffs data belonging to other users of the network. Packet sniffers can operate for various reasons, such as an administrative tool, a performance monitoring/improvement tool or for malicious purposes (depending on the user's intent). Network administrators use them for monitoring and validating network traffic. Packet sniffers are basically applications or programs used to read packets that travel across the network. (packets are retrieved from a network layer and data is interpreted.) Packet sniffers are very useful network administration.

Before un-connected ESLs attempt to reconnect, the system checks to see if there is a network outage or a power outage. The system then attempts to count the number of devices that find themselves in the same operational predicament. Following an outage (network outage, power outage, etc.), it is a desired technical advantage for the ESLs to reconnect to the APs in a relatively short period of time and with low power consumption or losses. The faster the reconnect time and the lower the power consumed or expended the better.

Packet sniffing looks at each packet as it flows across a network. It is a technique in which a user sniffs data belonging to other users of the network. Packet sniffers can operate for various reasons, such as an administrative tool, a performance monitoring/improvement tool or for malicious purposes (depending on the user's intent). Network administrators use them for monitoring and validating network traffic. Packet sniffers are basically applications or programs used to read packets that travel across the network. (packets are retrieved from a network layer and data is interpreted.) Packet sniffers are very useful network administration.

In one exemplary active synchronization scenario, the ESLs perform a passive synchronization. If successful, the ESLs will transmit a response back to the AP. This happens over a time period threshold, such as every few minutes for example. If an AP fails to receive the sync within a time period threshold, the AP may suspect that a problem exists, or it may be a precursor to a problem that is about to manifest itself. Because of its network location and proximity to a potential problem, the ESL will know much sooner if there is a problem. Therefore, it makes sense to try and resolve this problem at the ESL, rather than at the AP or at some other network location.

Those skilled in the art will appreciate that different thresholds, time periods, response times, data content, signal information, communication network characteristics etc. can be used without deviating from the scope of this disclosure.

In one scenario, a customer has temporarily walked in front of an ESL and sync is lost for a short period of time like a few seconds. Some of the causes of losing active or passive sync were discussed previously. A lost of active or passive sync could arise for any number of reasons. For example, a customer or member of the staff positions a packing trolley close to the ESL, and sync may be lost for as long as the trolley is blocking or obscuring the ESL (e.g. 1 to 10 minutes).

In another scenario, an employee may have intentionally or unintentionally moved an ESL and it may now need to change to a different AP. It would be desirable to minimize the time to find a new AP relatively quickly, such as within a few seconds of elapsed time.

Additionally, the system suffers a wide spread power outage (or a network outage) and all of the ESLs have lost connection at the same time. In this case, it would be desirable to minimize the time for all ESLs to reconnect, such as within thirty (30) minutes for example. During initial connection, the ME decides the best AP to connect to for each ESL. This decision can be based on factors, such as existing channel conditions, observed network performance/ status, and power level status. If an ESL is connected to a poorly performing AP, that ESL may suffer an adverse battery life, as well as degraded performance. When an ESL changes the AP it is connected to, this may increase power consumption, and if the new AP is performing worse that the AP that it was connected to, battery life and network performance will also be reduced and may be worse than before.

Therefore, if an ESL temporarily loses connection, an important priority is reconnecting to the same AP. If the ESL cannot connect to the AP, the ESL may find itself in one of the following scenarios.

In one exemplary scenario, the ESL has been blocked and cannot connect to its best AP for 10 seconds or more. In this case, because of the physical obstruction, the blocked ESL should look for alternative APs.

In another exemplary scenario, this loss of connection may occur occasionally and only affects a relatively small number of ESLs. The ESL has been physically moved, and therefore it is looking for a new AP to connect to. This should not happen very often, and should only affect a small number of ESLs.

In another exemplary scenario, a single AP stops working altogether. In this case, all the ESLs that were attached to this failed AP must look for an alternative AP to connect to. This event should not happen very often statistically speaking, but when it does occur, it affects many ESLs. This results in all the ESLs trying to reconnect to another AP at the same time or very close to the same time.

In another exemplary scenario, everyone of the APs suffers a power-cut or outage, in which case waiting for power-up and staying with the existing AP it was previously connected to is a good approach. Unfortunately, in this event, the timing schedule for each ESL is lost. So while returning to the same AP is good in theory, this procedure does not work very well in practice. Even as little as a ten (10) seconds of power loss will result in un-connection.

In another exemplary scenario, the ME fails. Although this is a relatively rare event, when it does happen, all the ESLs will try and reconnect at the same time or very close to the same time. In this case, it is unclear what the APs will do from a security point of view (POV). It may be possible that the APs continue to repeat their sync signals, or they may have to stop altogether.

In many of these cases, looking for a new AP may be the best solution. However, it means dealing with large numbers of ESLs all trying to reconnect at the same time. This is problematic, because they could jam each other in attempting to reconnect, thereby preventing or hindering reconnection.

One possible solution to the power-up jamming problem is to put the ESLs to sleep for random periods of time (up to ten (10) minutes). This reduces the density of ESLs trying to reconnect in a given time and reduces the jamming or congestion problem. Although, some jamming is inevitable, there are some simulations that suggest that the ESLs do reconnect within about thirty (30) minutes, which is an acceptable amount of time. Unfortunately, there could be a delay of up to ten (10) minutes when an ESL is moved or blocked for more than ten seconds.

Another aspect includes each ESL detects that it has been un-connected from its AP. For example, no passive sync is detected for ten (10) seconds. The ESL transmits a beacon signal to arrive within either a first or second time window, and within the approximated AP's last known frame timing. This is a common time known to all ESLs that were connected to the same AP. The ESL captures signal data in the first or second time window when it was not transmitting, and determines a first Received Signal Strength Indication (RSSI) signal level. When there are many ESLs all connecting at the same time, some will transmit in the first window and some will transmit in the second window.

In another exemplary scenario, each ESL will detect the accumulated RSSI of roughly half of the neighbouring ESLs. Each ESL captures a second RSSI level in a third time window (which occurs shortly after the second time window) in which no transmissions are expected.

If the first RSSI level is significantly larger than the second RSSI level, then it is likely that many ESLs have been un-connected at the same time. This may indicate there has been a failure of the local AP. The solution described may not be able to distinguish between un-connects, due to a few local ESLs that have a local obstruction (e.g. a trolley or shopping cart), and a power-cut/broken AP, where many devices are un-connected. If the few local ESLs believe there has been a power-cut, they may become unresponsive for up to 10-mins, when the local obstruction has been moved. If these two cases can be separated, the obstructed ESL tags could reconnect quicker. These further aspects provide an indication of the number of recently un-connected devices, which may allow better determination of the situation they are in.

Two things may be done to address this. The signal packets are made shorter and/or the receive window made wider. This has the tendency to increase the variance in signal level throughout the time window, when the number of transmissions is smaller. A metric is created that combines the mean RSSI level over the receive window with variances of the signal level over the receive window.

In another scenario, a metric value can be calculated and utilized. For example, one metric can be defined by the following equation. Metric=variance/mean−RSSI.

This Metric is roughly inversely proportional to the number of devices that are transmitting within the time window. The Metric is used to distinguish between one situation of many devices being un-connected due to an AP power-cut/failure, versus another situations, where few devices un-connected due to a local obstruction.

In an alternative solution, an un-connected ESL briefly sniffs the channel it is about to transmit data on. The un-connected ESL only transmits if the channel is clear. For this to work well, there needs to be a very short time between the sniff operation and a transmit operation. This approach may reduce the chances of data collisions with the many ESLs that are transmitting data.

Figure 5:
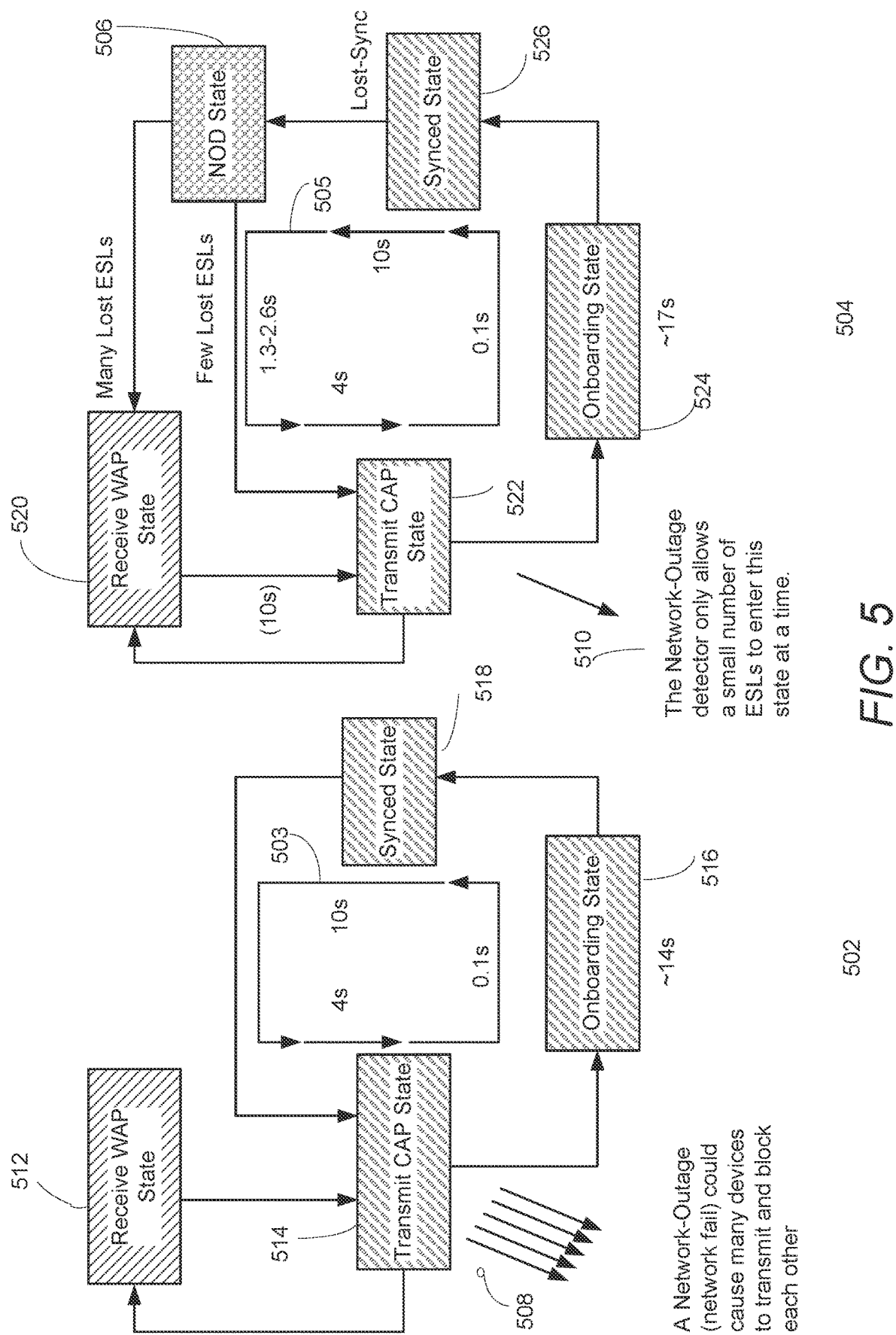
FIG. 5 illustrates two exemplary network-outage detectors.

FIG. 5 illustrates two exemplary network-outage detector scenarios, 502 and 504. The one shown in 504 includes an exemplary network-outage detector state 506. The one shown in 502 does not include the network-outage detector (NOD) state 506.

In the exemplary network-outage detector shown in FIG. 5, 502, four exemplary operational states are shown. They are a received WAP state 512, a transmit CAP state 514, an onboarding state 516, and a synced state 518. An exemplary timing loop denoted in seconds is shown in 503, as well as an example time period duration of fourteen (14) seconds associated with the onboarding state 516. The network-outage detector shown in FIG. 5, 502 could cause many devices to transmit and block each other.

In the exemplary network-outage detector state shown in FIG. 5, 504, five exemplary operational states are shown. They are a received WAP state 520, a transmit CAP state 522, an onboarding state 524, a synced state 526 and a NOD state 506. An exemplary timing loop denoted in seconds is shown in 505, as well as an example time period duration of fourteen (17) seconds associated with the onboarding state 524. The network-outage detector shown in FIG. 5, 504 only allows a small number of ESLs to enter this state at a time 510.

This network-outage detector can detect a complete power cut or outage, or a partial network-outage. If a network-outage or failure occurs, this could cause many devices to transmit simultaneously or near simultaneously and cause them to block or interfere with the data transmission with each other 508.

The network-outage detector 504 including the NOD state 506 prevents many devices from getting stuck in the Transmit CAP state. The network-outage detector 504 only allows a small number of ESLs to enter this state at this time.

Figure 6:
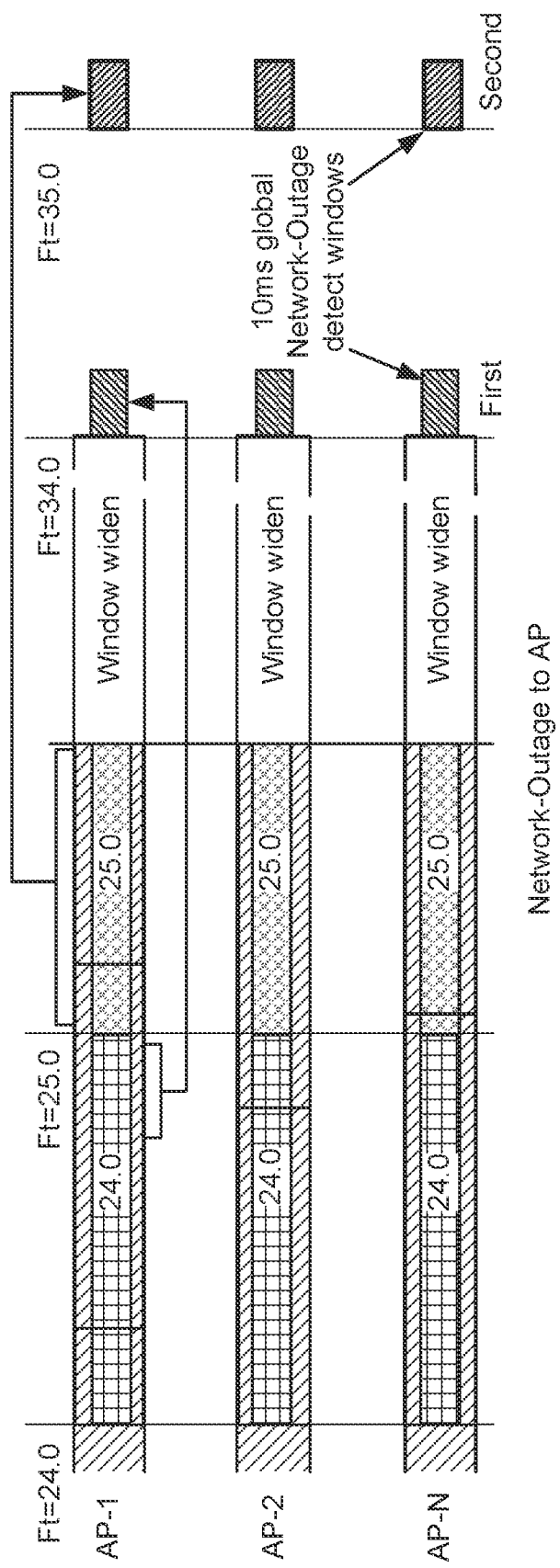
FIG. 6 illustrates a timing diagram of a network-outage detector.

FIG. 6 illustrates a timing diagram of a network-outage detector shown from an AP viewpoint and operates in the following manner. APs (e.g AP-1, AP-2, ... AP-N) send out a global 1 millisecond (1 ms) frame-timestamp to all of the APs that are on an exemplary network with powered and connected APs. When ESLs lose sync (e.g. during a network outage), they retain their last known timestamps at Ft.

Each ESL attempts to reconnect during a period when a window is widening. If a failure is detected, then the network-outage detector is invoked. Each ESL wakes up at its last global frame-timestamp, plus a fixed period for a 10 millisecond (10 ms) window. The ESLs record the detected power levels during this window.

The ESLs determines a measure of how many other ESLs devices also have a network outage. From a probabilistic standpoint, a number of power outages (or other operational conditions or triggers) could occur simply by chance, and therefore a second detect window could also be included to help compensate for these chance conditions.

Figure 7:
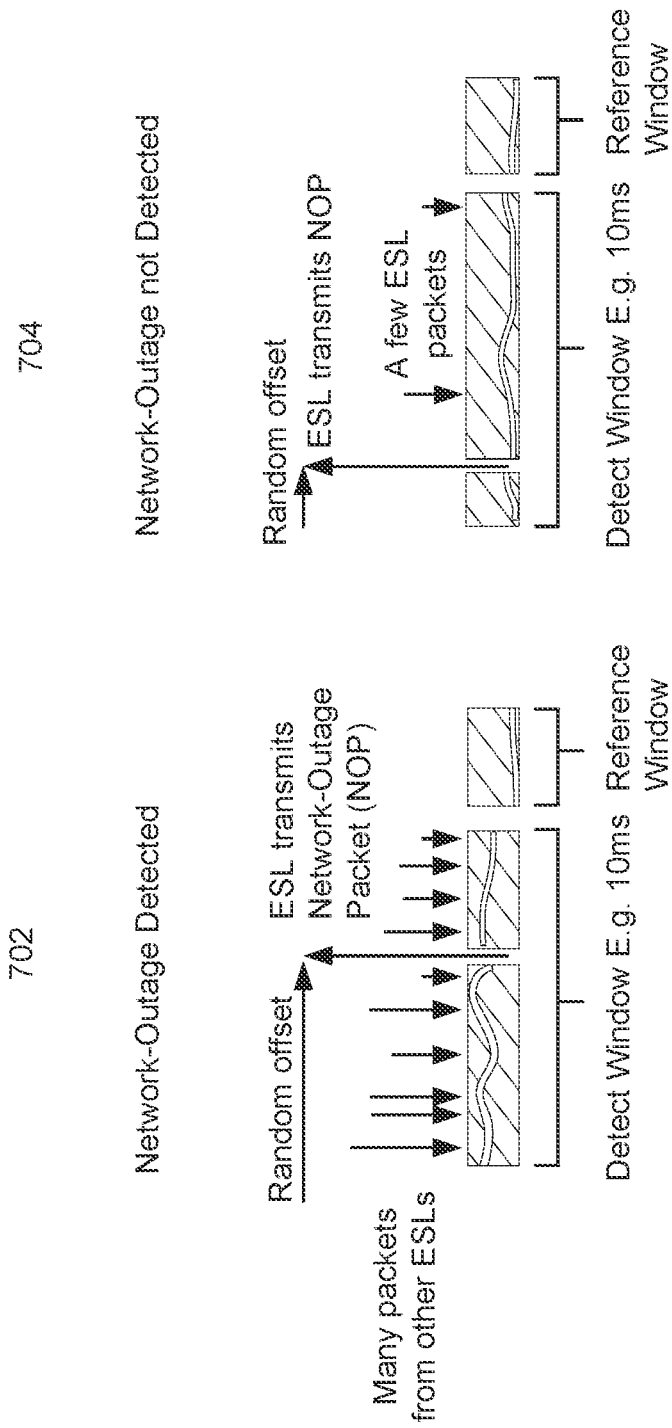
FIG. 7 illustrates two exemplary network-outage detectors, one detecting a network outage and the other not detecting an outage.

FIG. 7 illustrates two exemplary network-outage detector operation scenarios from an ESL perspective. The first scenario is when a network outage is detected (702). The second scenario is when a network outage is not detected (704).

In the first scenario, when a network-outage is detected, an ESL determines a random offset, where it will transmit a small [e.g. 40 microsecond (us)] packet (e.g. a NOP packet). During the detect window, the ESL records a power-level profile, however it does not attempt to decode any associated data. A dedicated Access Address is used to improve selectivity and to avoid other Bluetooth Low Energy (BLE) traffic. At a determined random-offset, the ESL transmits its packet.

The ESL continues to record or store data during a reference window that is expected to be empty. The RSSI profile, when compared to the reference window, is then used to count the number of transmitters. If the count is a higher number, this may imply that a network-outage has been detected. A smaller number of detections may require using a second network-outage detection one (1) frame later.

The second scenario illustrated in FIG. 7 704, shows when a network-outage is not detected. In a similar manner described in the first scenario of 702, there is an ESL determining a random offset, an ESL transmitting NOPs, a detect window (e.g. 10 ms) and a reference window. The main difference here is that there are fewer ESL packets occurring, versus the many discussed previously in the first scenario.

Figure 8:
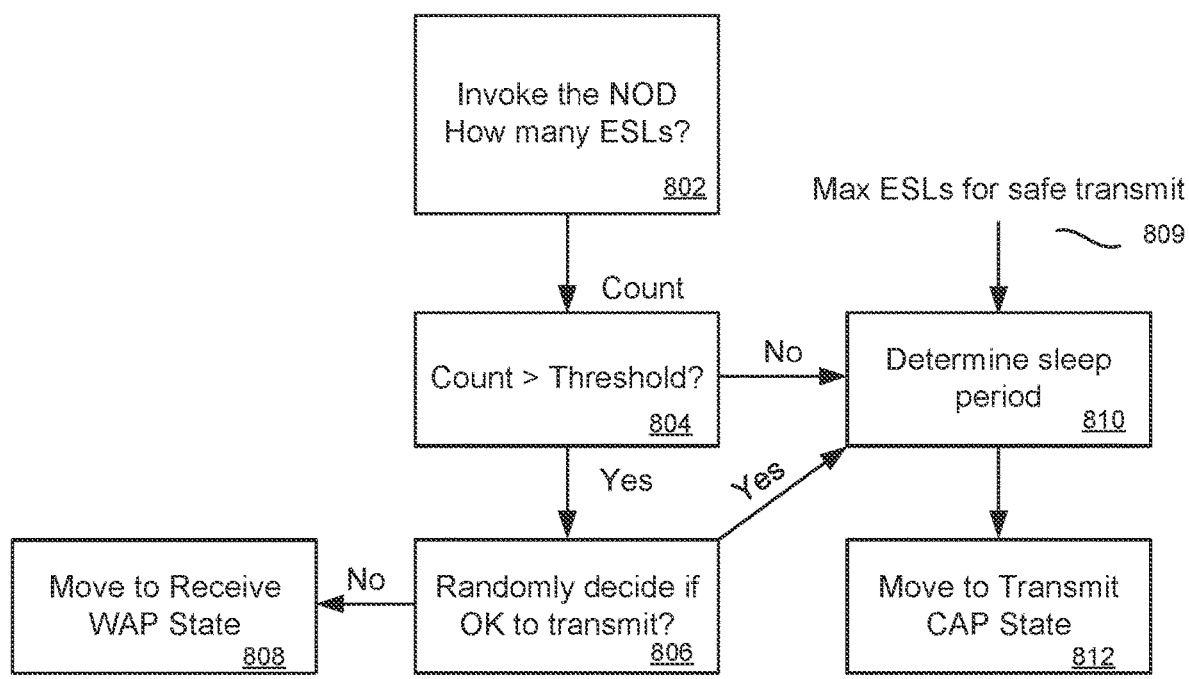
FIG. 8 illustrates exemplary secondary controls of a network-outage detector.

A network-outage detector also supports secondary controls. An example is shown in FIG. 8. A NOD is invoked to determine how many ESLs 802 are included in the communication network. In conjunction with the determination of 802 above, they are also counted and compared against a threshold or count parameter in 804. If the count is determined to be greater than the threshold, a random decision is made to decide if it is okay to transmit 806. If the answer is yes (i.e. the count is greater than the threshold), then the detector moves to randomly decide if it is OK to transmit. Conversely, if the answer is no, then the detector moves to determine a sleep period 810. After this determination, the detector then moves to transmit a CAP state 812.

In one scenario, a NOD returns a measure of the number of devices that have been un-connected. Using this measure, an ESL can autonomously determine which state to go into. The ESL can also determine how often to transmit CAPs or receive WAPs. Simulations determine the maximum number of ESLs that can safely transmit and navigate the network 809.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, etc.).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an Internet of Things (IoT) device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for a first communication device to determine an approximate number of other communication devices that have lost contact with a host communication device comprising:
    determining a common future time window using a last known global time stamp;
    determining a transmit time within the common future time window;
    capturing received samples during the common future time window on a predefined communication channel; and
    analyzing the received samples to estimate a total number of other communication devices that have lost contact with the host communication device.

2. The method of claim 1, wherein the transmit time is uniformly distributed to fit within the common future time window.

3. The method of claim 1, wherein the transmit time is selected to determine a plurality of un-connected communication devices based on a power-level profile of the received samples.

4. The method of claim 3, wherein the plurality of un-connected communication devices represents a large number of un-connected communication devices.

5. The method of claim 1, wherein analyzing the received samples excludes a time period when a communication device was transmitting.

6. The method of claim 1, wherein analyzing the received samples includes determining a Received Signal Strength Indication (RSSI).

7. An apparatus for a first communication device to determine an approximate number of other communication devices that have lost contact with a host radio device comprising:
    a processor for determining a common future time window using a last known global time stamp;
    a transmitter and receiver for determining a transmit time within the common future time window;
    a processor memory for capturing received samples during the common future time window on a predefined communication channel; and
    an analyzer for analyzing the received samples to estimate a total number of other communication devices that have lost contact with the host radio device.

8. The apparatus of claim 7, wherein the transmit time is uniformly distributed to fit within the common future time window.

9. The apparatus of claim 8, wherein the transmit time is selected to determine a plurality of un-connected communication devices based on a power-level profile of the received samples.

10. The apparatus of claim 7, wherein a number of un-connected communication devices represent a large number of un-connected radio devices.

11. The apparatus of claim 7, wherein analyzing the received samples excludes a time period where a communication device was transmitting.

12. The apparatus of claim 7, wherein analyzing the received samples includes determining a Received Signal Strength Indication (RSSI).

13. A communication device comprising:
    means for determining a common future time window using a last known global time stamp;
    means for determining a transmit time within the common future time window;
    means for capturing received samples during the common future time window on a predefined communication channel; and
    means for analyzing the received samples to estimate a total number of other communication devices that have lost contact with a host communication device.

14. A non-transitory computer-readable storage medium having computer-executable instructions recorded thereon, the computer-executable instructions configured to cause a communication device having one or more processors to:
   determine a common future time window using a last known global time stamp;
   determine a transmit time within the common future time window;
   capture received samples during the common future time window on a predefined communication channel; and
   analyze the received samples to estimate a total number of other communication devices that have lost contact with a host communication device.

* * * * *